(12) United States Patent
Dernovsek et al.

(10) Patent No.: US 9,875,831 B2
(45) Date of Patent: Jan. 23, 2018

(54) METHOD FOR PRODUCING A MULTI-LAYER VARISTOR COMPONENT AND A MULTI-LAYER VARISTOR COMPONENT

(71) Applicant: EPCOS AG, Munich (DE)

(72) Inventors: Oliver Dernovsek, Lieboch (AT); Jutta Koholka, Lannach (AT)

(73) Assignee: EPCOS AG, Munich (DE)

( * ) Notice: Subject to any disclaimer, the term of this patent is extended or adjusted under 35 U.S.C. 154(b) by 65 days.

(21) Appl. No.: 14/901,694

(22) PCT Filed: May 20, 2014

(86) PCT No.: PCT/EP2014/060354
§ 371 (c)(1),
(2) Date: Dec. 28, 2015

(87) PCT Pub. No.: WO2014/206650
PCT Pub. Date: Dec. 31, 2014

(65) Prior Publication Data
US 2016/0314880 A1 Oct. 27, 2016

(30) Foreign Application Priority Data
Jun. 28, 2013 (DE) .................. 10 2013 106 810

(51) Int. Cl.
| | |
|---|---|
| *H01C 7/10* | (2006.01) |
| *H01C 7/18* | (2006.01) |
| *H01C 1/148* | (2006.01) |
| *H01C 17/28* | (2006.01) |
| *H01G 4/232* | (2006.01) |

(52) U.S. Cl.
CPC ............... *H01C 7/18* (2013.01); *H01C 1/148* (2013.01); *H01C 7/1006* (2013.01); *H01C 17/281* (2013.01); *H01C 17/283* (2013.01); *H01G 4/2325* (2013.01)

(58) Field of Classification Search
CPC ........ H01C 7/18; H01C 1/148; H01C 17/281; H01C 7/1006; H01C 17/283
USPC .......................................................... 338/20
See application file for complete search history.

(56) References Cited

U.S. PATENT DOCUMENTS

| | | |
|---|---|---|
| 5,672,220 A | 9/1997 | Omori et al. |
| 5,750,264 A | 5/1998 | Ueno et al. |
| 5,759,480 A * | 6/1998 | Hennings .............. C04B 35/468 156/89.17 |
| 6,160,472 A | 12/2000 | Arashi et al. |

(Continued)

FOREIGN PATENT DOCUMENTS

| | | |
|---|---|---|
| DE | 4317719 A1 | 12/1993 |
| DE | 19921109 A1 | 12/1999 |

(Continued)

*Primary Examiner* — Kyung Lee
(74) *Attorney, Agent, or Firm* — Slater Matsil, LLP

(57) ABSTRACT

A method for producing a multi-layer varistor component is specified. A main body for the multi-layer varistor component includes a plurality of internal electrodes. The method further includes providing the main body with a starting material for a copper electrode layer in such a way that the starting material is directly connected to at least one internal electrode. A thermal treatment of the starting material is performed under a protective gas atmosphere in order to form the copper electrode layer.

15 Claims, 4 Drawing Sheets

(56) References Cited

U.S. PATENT DOCUMENTS

| | | |
|---|---|---|
| 6,515,844 B1 | 2/2003 | Moriwaki et al. |
| 2008/0118721 A1 | 5/2008 | Horie et al. |
| 2013/0020913 A1 | 1/2013 | Shirakawa et al. |

FOREIGN PATENT DOCUMENTS

| | | |
|---|---|---|
| EP | 0708457 A1 | 4/1996 |
| EP | 0734031 A2 | 9/1996 |
| EP | 1156498 A2 | 11/2001 |
| JP | H08124718 A | 5/1996 |
| JP | H08330107 A | 12/1996 |
| JP | 2004079618 A | 3/2004 |
| JP | 2011216877 A | 10/2011 |
| JP | 2012064994 A | 3/2012 |
| JP | 2013197447 A | 9/2013 |

* cited by examiner

FIG 1
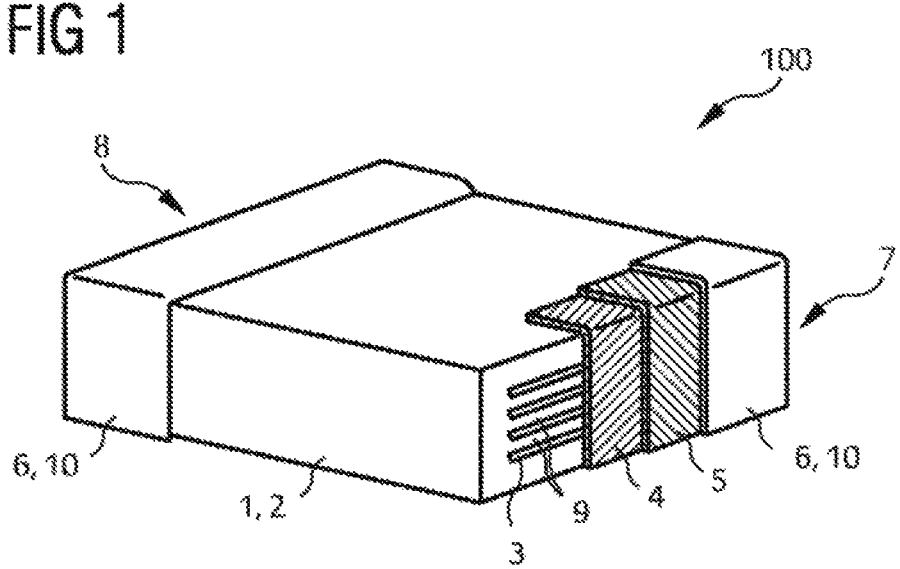
FIG 2
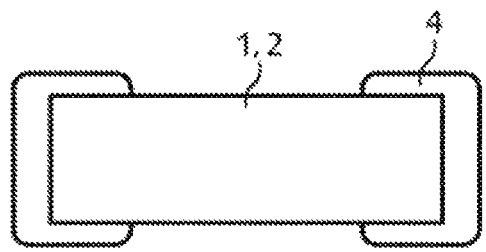
FIG 3
| Electrical Parameters | Ag | Cu |
|---|---|---|
| Uv [V] | 99.87 | 103.1 |
| Is [µA] | 0.31 | 0.34 |
| C [pF] | 86.8 | 73.8 |

METHOD FOR PRODUCING A MULTI-LAYER VARISTOR COMPONENT AND A MULTI-LAYER VARISTOR COMPONENT

This patent application is a national phase filing under section 371 of PCT/EP2014/060354, filed May 20, 2014, which claims the priority of German patent application 10 2013 106 810.3, filed Jun. 28, 2013, each of which is incorporated herein by reference in its entirety.

TECHNICAL FIELD

The present invention relates to a method for producing a multi-layer varistor component. The present invention furthermore relates to a multi-layer varistor component.

SUMMARY

Embodiments of the invention specify an improved, in particular cost-effective, multi-layer varistor component, and a method for producing same.

A proposed method comprises providing a main body for a multi-layer varistor component, wherein the main body comprises a plurality of internal electrodes. The internal electrodes are preferably arranged one above another within the main body. The internal electrodes are furthermore expediently electrically isolated from one another.

Preferably, the internal electrodes are furthermore arranged and embodied one above another in such a way that they at least partly overlap, wherein adjacent internal electrodes are accessible from opposite end sides of the main body. The end sides preferably describe side faces of the main body. Furthermore, the main body comprises varistor layers arranged between the internal electrodes. The varistor layers are expediently electrically insulating or semiconducting. The varistor layers preferably comprise zinc oxide, in particular polycrystalline zinc oxide. Preferably, the varistor layers consist of zinc oxide at least to the extent of 90%. The material of the varistor layers can be doped with bismuth and/or antimony or further additives or dopants.

The method furthermore comprises providing the main body with a starting material for a copper electrode layer in such a way that the starting material is directly connected to at least one internal electrode. Preferably, the main body is provided with the starting material only in the region of the end sides. Preferably, the starting material at two opposite end sides of the main body is connected to the internal electrodes in such a way that it is in direct mechanical contact with all the internal electrodes accessible from an end side of the main body.

The method furthermore comprises thermal treatment of the starting material under a protective gas atmosphere in order to form the copper electrode layer. For this purpose, the starting material contains copper. The starting material can furthermore contain carbon or carbon compounds, for example. In other words, the starting material is exposed to the protective gas atmosphere. The protective gas atmosphere is provided in particular for preventing oxidation of the copper for the copper electrode layer or for protecting the copper electrode layer against oxidation. Such oxidation can adversely affect or destroy the electrical properties of the multi-layer varistor component that are desired during operation, by virtue of the fact that the oxygen to which the starting material and/or the material of the main body would be exposed without the protective gas atmosphere reacts with the starting material and/or the material of the main body.

Specifically, the oxygen in the varistor layers can lead to a disproportionation of individual constituents, such as of zinc and of oxygen, as a result of which the electrical, in particular the semiconducting, properties of the multi-layer varistor component would be impaired. Moreover, for example, an electrical contact of the copper electrode layer with the internal electrodes could be impaired by the oxidation.

The method furthermore comprises completing the multi-layer varistor component.

A particularly cost-effective multi-layer varistor component can advantageously be produced by the method presented. The copper electrode layer is preferably part of an external electrode of the multi-layer varistor component. As a result of the use of copper, the external electrode can be produced particularly cost-effectively in comparison with other electrode materials, such as, for example, silver, palladium, platinum or gold.

In one preferred configuration of the method, the main body is likewise exposed to the protective gas—besides the starting material—during the thermal treatment.

In one preferred configuration, the main body has a surface passivation which functions as a diffusion barrier for a diffusion of the protective gas into the main body during the thermal treatment of the starting material. The surface passivation is preferably composed of a glass or comprises a glass. The surface passivation is preferably a passivation layer. The provision of the surface passivation makes it possible to prevent or reduce not only a diffusion of the protective gas into the main body but also a diffusion or corrosion of the main body by other, for example, corrosive, substances to which the main body can be exposed during the production of the multi-layer varistor component.

In one preferred configuration of the method, the starting material for the copper electrode layer is a copper-containing paste. The copper-containing paste preferably contains carbon additives. The copper-containing paste is decarbonized by the thermal treatment or fired into the main body. "Decarbonizing" is intended to mean that carbon is driven out of the starting material by the thermal treatment.

The copper electrode layer is preferably formed by the thermal treatment of the copper-containing paste or the firing thereof into the main body.

In one preferred configuration, the main body is provided with the starting material for the copper electrode layer by means of a screen printing method.

As a result of the decarbonizing and/or as a result of the firing of the starting material into or onto the main body, an electrical contact between the internal electrodes and the copper electrode layer is preferably produced.

The starting material can be subjected to thermal treatment at temperatures of between 400° C. and 600° C.

In one preferred configuration of the method, the starting material is subjected to thermal treatment at temperatures of below 570° C. This configuration makes it possible, in particular, to prevent the protective gas from being able to diffuse or pass through the surface passivation via thermal diffusion processes during the thermal treatment, and thus from destroying or impairing the electrical properties of the multi-layer varistor component.

In one preferred configuration of the method, the starting material is subjected to thermal treatment at temperatures of above 400° C. This configuration makes it possible to ensure that sufficient temperatures are available for the decarbonizing or the firing of the starting material.

In one preferred configuration of the method, the protective gas comprises nitrogen or a noble gas. Preferably, at least a predominant portion of the protective gas consists of nitrogen or a noble gas. As a result of this configuration, an inert gas can expediently be made available for the protective gas, as a result of which it is possible to prevent a reaction, for example, oxidation, of the starting material for the copper electrode layer.

In one preferred configuration of the method, the protective gas atmosphere has an oxygen proportion of less than 300 ppm ("ppm" stands for "parts per million"). This configuration advantageously makes it possible to prevent significant oxidation of the starting material for the copper electrode layer during the thermal treatment.

In one preferred configuration of the method, at least one further electrode layer is deposited on the copper electrode layer after the thermal treatment in order to form together with the copper electrode layer an external electrode of the multi-layer varistor component.

In one preferred configuration, the at least one further electrode layer is deposited electrochemically by means of electrolytic processes.

Preferably, in this case, at least two further electrode layers are deposited on the copper electrode layer in order to form, together with the copper electrode layer, the external electrode.

In one preferred configuration, a nickel layer or a nickel-containing layer is deposited as further electrode layer on the copper electrode layer. The further electrode layer is preferably constituted in such a way that diffusion of material of an additional, for example, outer, electrode layer deposited on the further electrode layer into the copper electrode layer is advantageously prevented. In other words, the further electrode layer can function as a diffusion barrier for material of an outer electrode layer deposited thereon, for example, during the operation of the multi-layer varistor component.

In one preferred configuration, a tin layer is deposited on the further electrode layer as outer electrode layer. As a result of this configuration, the multi-layer varistor component can advantageously be embodied in a solderable and/or surface-mountable fashion.

Furthermore, a multi-layer varistor component is specified. The multi-layer varistor component comprises an external electrode having a region with a copper electrode layer, wherein the copper electrode layer is directly electrically conductively connected to a plurality of internal electrodes of the multi-layer varistor component. The copper electrode layer has less than 0.1 atomic percent of oxygen. As a result of the provision of the copper electrode layer, the external electrode of the multi-layer varistor component and/or the multi-layer varistor component can be configured cost-effectively, in particular.

The multi-layer varistor component is preferably producible or produced by means of the method described above. In particular, all features disclosed for the multi-layer varistor component can also relate to the method, and vice versa.

In one preferred configuration, the multi-layer varistor component comprises a surface passivation, which is interrupted in a region in which the copper electrode layer is directly electrically conductively connected to the internal electrodes. An electrical connection of the internal electrodes to the copper electrode layer is made possible by this configuration.

In one preferred configuration, the varistor voltages of the multi-layer varistor component and of a comparison component in which the copper electrode layer is replaced by a silver electrode layer deviate from one another by 10% or less. As a result of this configuration, the multi-layer varistor component can advantageously be embodied in such a way that it is suitable for a specific application with regard to its electrical or varistor properties just as well as the comparison component, the production of which is significantly more cost-intensive to produce owing to the use of silver.

In one preferred configuration, a varistor current of the multi-layer varistor component and a varistor current of the comparison component deviate from one another by 20% or less under otherwise identical conditions. As a result of this configuration, the multi-layer varistor component can advantageously be embodied in such a way that it is suitable for a specific application with regard to its electrical or varistor properties just as well as the comparison component.

The percentage values of the abovementioned deviations can relate, for example, to the respective higher value of the varistor voltages and varistor currents.

In one preferred configuration, the external electrode has a region, comprising a nickel layer, for example. With the aid of said region, it is advantageously possible to prevent, for example, diffusion of the material of an external region of the external electrode into the region through the nickel layer. In other words, the region can serve as a diffusion barrier for material of the external region.

In one preferred configuration, the external electrode has an external region, comprising a tin layer, for example. As a result of this configuration, the multi-layer varistor component can be electrically connected to a printed circuit board or further electrical components in an application of the multi-layer varistor component in a solderable manner by means of the tin layer, in particular.

In one preferred configuration, the multi-layer varistor component is embodied in a surface-mountable fashion. As a result of this configuration, the multi-layer varistor component is arrangeable and/or usable in turn in a space-saving fashion, for example, on a printed circuit board.

In one preferred configuration, the multi-layer varistor component is embodied in such a way that the varistor voltage changes by less than 10% under conditions of a reliability test that is expedient for an application of the multi-layer varistor component, for example, for electrostatic discharges. The reliability test can be an ESD test ("ESD" stands for "electrostatic discharge"). The reliability test can preferably comprise applying short voltage pulses to the multi-layer varistor component or a pulsed electrical load of the multi-layer varistor component with short voltage pulses.

BRIEF DESCRIPTION OF THE DRAWINGS

Further advantages, advantageous configurations and expediencies of the invention will become apparent from the following description of the exemplary embodiments in association with the figures.

FIG. 1 shows a perspective, schematic illustration of at least part of a multi-layer varistor component.

FIG. 2 shows a schematic plan or side view of at least part of the multi-layer varistor component.

FIG. 3 shows a table with electrical parameters of the multi-layer varistor component and of a comparison component.

Figure 4:
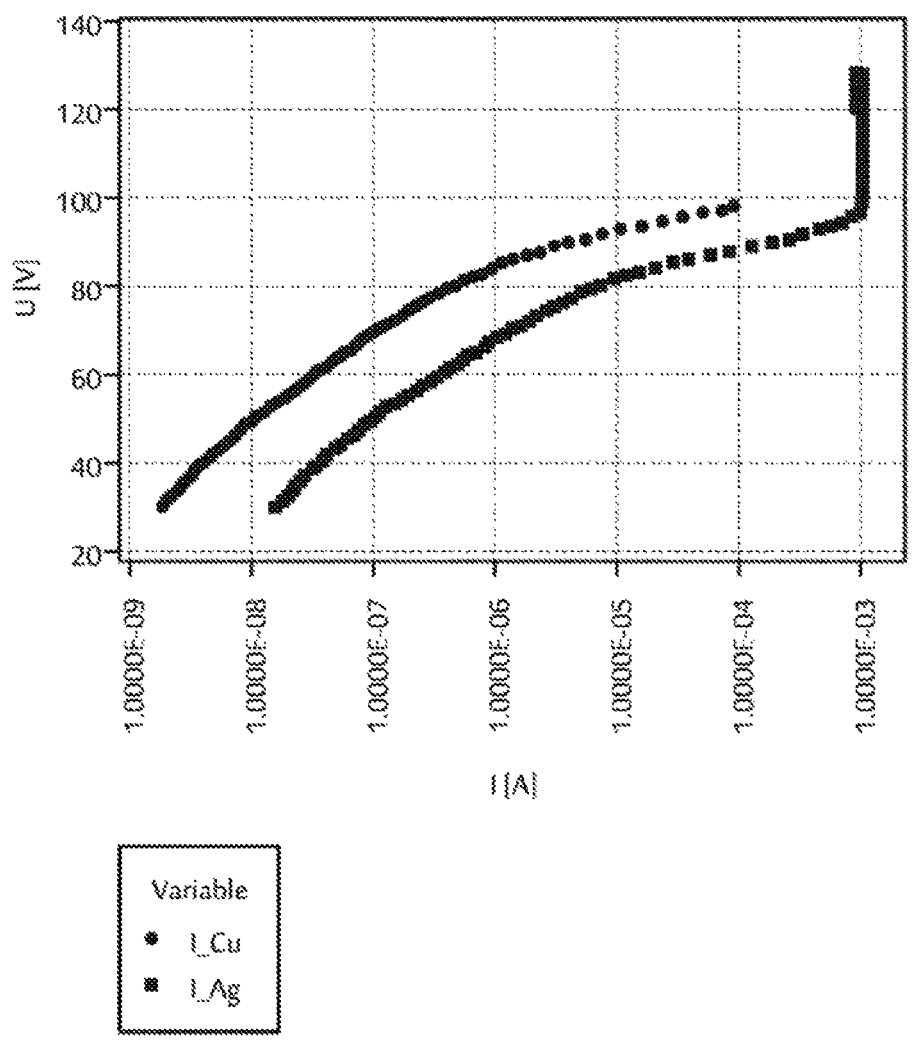
FIG. 4 shows a voltage-current characteristic curve of the multi-layer varistor component and of a comparison component.

Elements that are identical, of identical type and act identically are provided with identical reference signs in the figures. The figures and the size relationships of the elements illustrated in the figures among one another should not be regarded as to scale. Rather, individual elements may be illustrated with exaggerated size in order to enable better illustration and/or in order to afford a better understanding.

DETAILED DESCRIPTION OF ILLUSTRATIVE EMBODIMENTS

FIG. 1 shows an illustration of a multi-layer varistor component 100, said illustration being incomplete for the sake of better illustratability. The multi-layer varistor component is preferably used as overvoltage protection, for example, of semiconductor components and/or integrated circuits, against momentary overvoltages (typically up to 8 kV). Such overvoltages can be caused by frictional electricity, for example.

The multi-layer varistor component 100 comprises a main body 1. The main body 1 preferably comprises varistor layers 9. The varistor layers preferably principally consist of, in particular polycrystalline, zinc oxide. The varistor layers 9 preferably comprise bismuth and/or antimony additives and/or are doped with these materials. In this case, an individual varistor element preferably consists of a crystalline zinc oxide grain. In this case, the abovementioned additives and/or dopants are preferably responsible for the high electrical resistance and/or the barrier layer at the grain boundary. The varistor layers 9 are preferably sintered.

The main body 1 furthermore has an end side 7 and an end side 8 opposite the end side 7.

The main body 1 furthermore has internal electrodes 3. The internal electrodes 3 are preferably arranged within the main body 1. Preferably, the internal electrodes 3 are arranged and embodied one above another in such a way that they are electrically isolated from one another and overlap, wherein adjacent internal electrodes are arranged at opposite end sides 7, 8. The internal electrodes 3 are accessible from the end sides 7, 8 at which they are respectively arranged. Preferably, adjacent internal electrodes at least partly overlap in order to form a region of the multi-layer varistor component 100 that is electrically active during the operation of said multi-layer varistor component. The varistor layers 9 are arranged between the internal electrodes 3.

The multi-layer varistor component 100 furthermore comprises a copper electrode layer 4. The copper electrode layer 4, at the end side 7, is directly mechanically and electrically conductively connected to the internal electrodes 3 that are accessible from the end side 7. The copper electrode layer 4 furthermore preferably comprises less than 0.1 atomic percent of oxygen.

The main body 1 was preferably provided with a starting material for the copper electrode layer 4 by means of a screen printing method. The starting material for the copper electrode layer 4 is preferably a copper-containing paste which, besides copper, can furthermore contain carbon and solvents. The copper-containing paste is decarbonized during a thermal treatment of the starting material or fired into the main body 1. Furthermore, the solvents or residues thereof can be evaporated by the thermal treatment.

The main body 1 is preferably subjected to thermal treatment in a temperature range of between 400° C. and 570° C.

The copper electrode layer 4 is preferably formed by the thermal treatment of the starting material for the copper electrode layer 4. The thermal treatment is carried out under conditions of a protective gas atmosphere. The protective gas is preferably nitrogen or a noble gas or comprises at least one of said substances as the main constituent. Preferably, the protective gas atmosphere has an oxygen proportion of less than 300 ppm.

The main body 1 is provided or coated with a surface passivation 2. The surface passivation 2 is provided, in particular, in order to protect the main body 1 or the varistor layers 9 and the internal electrodes 3 against corrosive substances that act on the main body 1, for example, in the course of electrolytic processes during the production of the multi-layer varistor component. The surface passivation 2 preferably likewise functions as a diffusion barrier for diffusion of the protective gas in the main body 1 during the decarbonizing or firing of the starting material for the copper electrode layer 4. The surface passivation 2 is preferably interrupted in regions in which the copper electrode layer 4 is directly electrically conductively connected to the internal electrodes 3. The surface passivation is preferably a passivation layer having a layer thickness of between 1 μm and 2 μm. The surface passivation 2 is preferably composed of glass or comprises glass.

In accordance with FIG. 1, a further electrode layer 5 is at least partly arranged or deposited on the copper electrode layer 4.

In accordance with FIG. 1, an outer electrode layer 6 is at least partly arranged or deposited on the further electrode layer 5. The outer electrode layer 6 preferably comprises tin or consists of tin.

The further electrode layer 5 is preferably a barrier layer. The further electrode layer 5 preferably comprises nickel or consists of nickel.

The further electrode layer 5 is preferably constituted in such a way that it protects the main body 1 and/or the copper electrode layer 4 against diffusion of tin into the main body 1. Tin or solutions used for an electrolytic deposition of tin, to which the multi-layer varistor component is exposed during its production or during its operation, are usually particularly corrosive and/or diffusive and can thereby damage the varistor layers 9.

Merely for the sake of better illustration, the further electrode layer 5 and the outer electrode layer 6 do not extend completely over the copper electrode layer 4. The further electrode layer 5 and the outer electrode layer 6 are preferably deposited electrolytically by means of galvanic processes.

The copper electrode layer 4, the further electrode layer 5 and the outer electrode layer 6 preferably form an external electrode 10 of the multi-layer varistor component 100.

Although not explicitly illustrated, the main body 1 is expediently likewise provided with a further external electrode 10 at the end side 8, analogously to the end side 7.

The copper electrode layer 4 can extend over an, in particular inner, region of the external electrode 10.

The further electrode layer can extend over an, in particular central, region of the external electrode 10.

The outer electrode layer can extend over an outer region of the external electrode 10.

FIG. 2 schematically shows a plan or side view of the multi-layer varistor component 100. It can be discerned that the copper electrode layer 4 is arranged at the end sides 7 and 8 of the multi-layer varistor component 100.

FIG. 3 shows a table with electrical parameters of the multi-layer varistor component comprising a copper electrode layer (Cu), and of a comparison component in which the copper electrode layer is replaced by a silver electrode layer (Ag). The varistor voltage $U_V$ is that voltage which is dropped across the varistor if a current of 1 milliampere (mA) flows through the varistor. For the multi-layer varistor component, the varistor voltage is 103.1 V. For the comparison component, the varistor voltage is 99.87 V. The varistor current or varistor leakage current $I_S$ is the current which flows through the component at a predefined voltage applied to the component. On the basis of the values shown, it can be discerned that varistor voltage and also varistor current, for example, of the comparison component are within a deviation of 10% of the respective values of the multi-layer varistor component. The electrical capacitances of the silver and respectively copper electrode layers are likewise indicated.

FIG. 4 shows a voltage-current characteristic curve of the multi-layer varistor component and of a comparison component. The differences in the characteristic curves arise on account of the slightly different varistor voltages or owing to the differences that result from the firing of the copper electrode layer, on the one hand, and the firing of the silver electrode layer (in the case of the comparison component), on the other hand.

Figure 5:
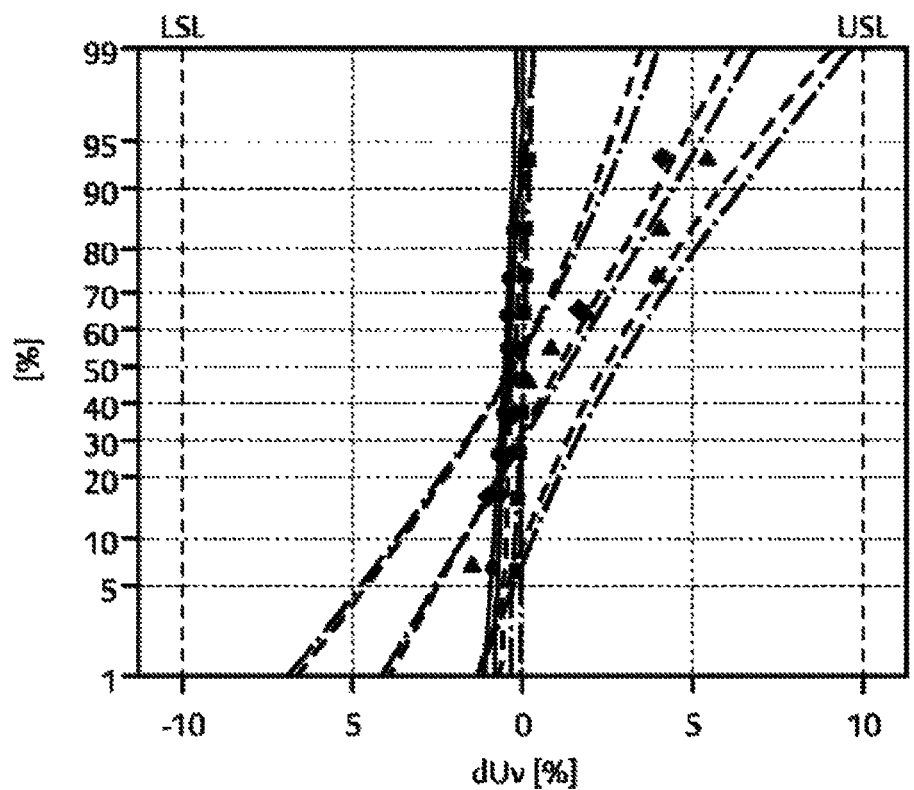
FIG. 5 shows results of an ESD test of the multi-layer varistor component and of a comparison component.

FIG. 5 shows results of an ESD test of the multi-layer varistor component and of a comparison component in which the copper electrode layer, as described above, is replaced by a silver electrode layer. Overvoltages, in particular, are simulated in the ESD test.

In the present case, in the ESD test, ten voltage pulses each of 8 kilovolts (kV) were applied to the multi-layer varistor component by means of galvanic contact. In the present case, the corresponding electrical contacts in the ESD test each have an electrical capacitance of 150 picofarads (pF) and an electrical resistance of 330 ohms. In the diagram in FIG. 5 it can be discerned that the change in the varistor voltage of the multi-layer varistor component (Cu) is less than 10% in comparison with a starting value even after the simulation, while the varistor voltage of the comparison component (Ag) analogously even changes by significantly less than 5%. Especially for the application of the multi-layer varistor component, the described changes in the varistor voltage as a result of the ESD test constitute a satisfactory result. In FIG. 5, "+" and "−", denote the positive and negative current direction, respectively.

Figure 6A:
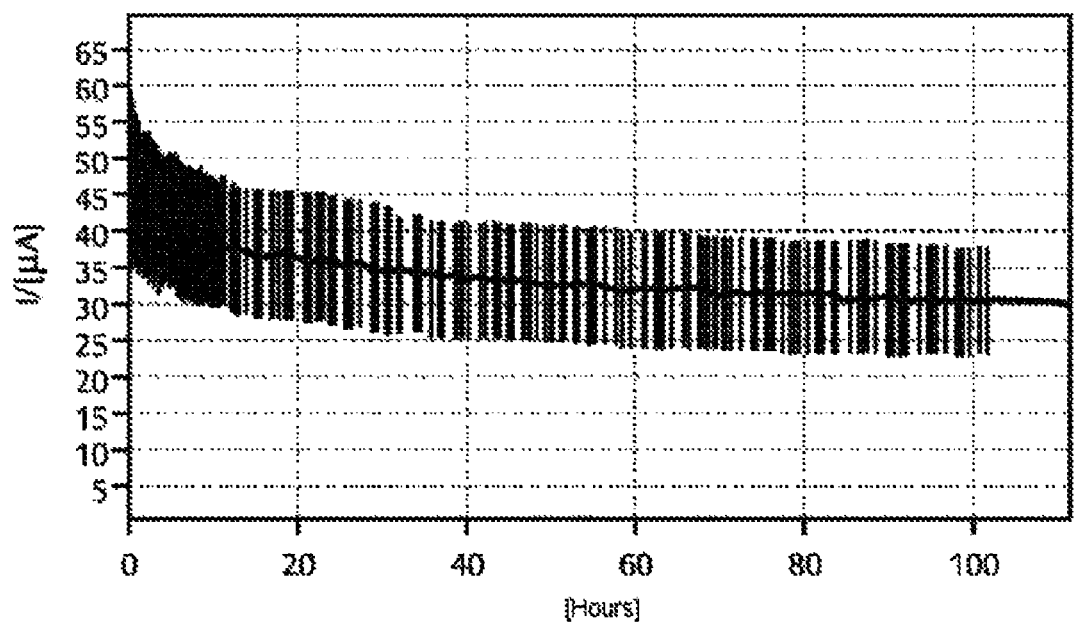
FIGS. 6A and 6B show long-term behavior of leakage currents of the comparison component (FIG. 6A) and of the multi-layer varistor component (FIG. 6B).
Figure 6B:
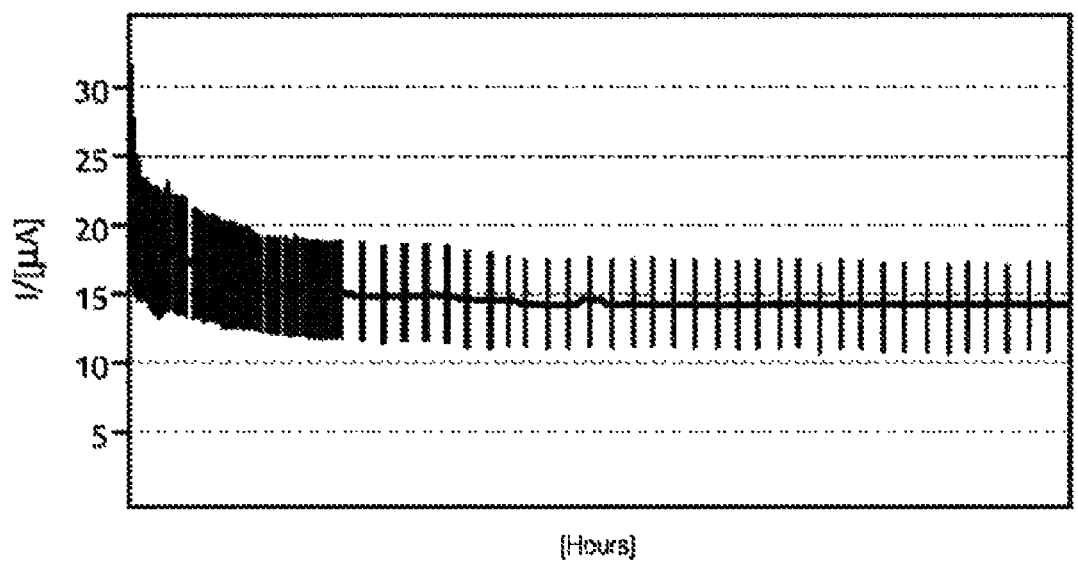

FIGS. 6A and 6B show results of a stabilization test in which the long-term behavior of the varistor current of the comparison component (FIG. 6A) and of the multi-layer varistor component (FIG. 6B) was tested. The test yields in particular insights about the lifetime of the respective component. In this case, the components were loaded with a voltage of 88 V at 125° C. over a time period of 1000 hours. It can be discerned that the varistor current for both components firstly decreases over time and undergoes transition to an approximately constant behavior.

The invention is not restricted by the description on the basis of the exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:

1. A method for producing a multi-layer varistor component, the method comprising:
   providing a main body for the multi-layer varistor component, wherein the main body comprises a plurality of internal electrodes;
   forming a starting material for a copper electrode layer on the main body in such a way that the starting material is directly connected to an internal electrode;
   performing a thermal treatment of the starting material under a protective gas atmosphere in order to form the copper electrode layer; and
   performing further steps to produce the completed multi-layer varistor component,
   wherein the main body is exposed to the protective gas atmosphere during the thermal treatment, and
   wherein the main body has a surface passivation that functions as a diffusion barrier for a diffusion of a protective gas of the protective gas atmosphere into the main body during the thermal treatment of the starting material.

2. The method according to claim 1, wherein the surface passivation comprises a passivation layer that is interrupted in a region in which the copper electrode layer is directly electrically conductively connected to the internal electrodes.

3. The method according to claim 1, wherein the starting material comprises a copper-containing paste that is decarbonized by the thermal treatment or fired into the main body.

4. The method according to claim 1, wherein the thermal treatment is performed at temperatures below 570° C.

5. The method according to claim 1, wherein the thermal treatment is performed at temperatures above 400° C.

6. The method according to claim 1, wherein the thermal treatment is performed at temperatures above 400° C. and below 570° C.

7. The method according to claim 1, wherein the protective gas atmosphere comprises nitrogen or a noble gas.

8. The method according to claim 1, wherein the protective gas atmosphere has an oxygen proportion of less than 300 ppm.

9. The method according to claim 1, wherein performing the further steps comprises depositing a further electrode layer on the copper electrode layer after the thermal treatment in order to form, together with the copper electrode layer, an external electrode of the multi-layer varistor component.

10. A multi-layer varistor component comprising:
    a main body having a plurality of internal electrodes; and
    an external electrode directly electrically conductively connected to the plurality of internal electrodes, the external electrode having a region with a copper electrode layer, the copper electrode layer having less than 0.1 atomic percent of oxygen; and
    a surface passivation, which is interrupted in a region in which the copper electrode layer is directly electrically conductively connected to the internal electrodes.

11. The multi-layer varistor component according claim 10, wherein the external electrode has a region that comprises a nickel layer.

12. The multi-layer varistor component according to claim 10, wherein the external electrode has an external region.

13. The multi-layer varistor component according to claim 12, wherein the external region comprises a tin layer.

14. A method for producing a multi-layer varistor component, the method comprising:
  providing a main body for the multi-layer varistor component, wherein the main body comprises a plurality of internal electrodes;
  providing the main body with a starting material for a copper electrode layer in such a way that the starting material is directly connected to an internal electrode;
  performing a thermal treatment of the starting material under a protective gas atmosphere in order to form the copper electrode layer, wherein the copper electrode layer has less than 0.1 atomic percent of oxygen; and
  performing further steps to produce the completed multi-layer varistor component,
  wherein the main body is exposed to the protective gas atmosphere during the thermal treatment, and
  wherein the main body has a surface passivation that functions as a diffusion barrier for a diffusion of a protective gas of the protective gas atmosphere into the main body during the thermal treatment of the starting material.

15. The method according to claim 14, wherein the copper electrode layer of the completed multi-layer varistor component has less than 0.1 atomic percent of oxygen.

* * * * *